United States Patent
Shimizu

(10) Patent No.: US 6,628,269 B2
(45) Date of Patent: Sep. 30, 2003

(54) TOUCH PANEL INPUT DEVICE CAPABLE OF SENSING INPUT OPERATION USING A PEN AND A FINGERTIP AND METHOD THEREFORE

(75) Inventor: Toshiyuki Shimizu, Saitama (JP)

(73) Assignee: NEC Corporation, Tokyo (JP)

( * ) Notice: Subject to any disclaimer, the term of this patent is extended or adjusted under 35 U.S.C. 154(b) by 177 days.

(21) Appl. No.: 09/778,727

(22) Filed: Feb. 8, 2001

(65) Prior Publication Data

US 2001/0013861 A1 Aug. 16, 2001

(30) Foreign Application Priority Data

Feb. 10, 2000 (JP) ........................... 2000-038189

(51) Int. Cl.[7] ................................. G09G 5/00
(52) U.S. Cl. ..................... 345/173; 178/18.05
(58) Field of Search ................... 345/173, 174, 345/175, 179, 180, 182; 178/18.01, 18.02, 18.05

(56) References Cited

U.S. PATENT DOCUMENTS

| | | | | |
|---|---|---|---|---|
| 4,864,084 A | * | 9/1989 | Cardinale | .............. 200/5 A |
| 4,983,787 A | * | 1/1991 | Kunikane | .............. 345/173 |
| 5,402,151 A | * | 3/1995 | Duwaer | .............. 178/18.05 |
| 5,986,223 A | * | 11/1999 | Kim | .............. 178/18.01 |

FOREIGN PATENT DOCUMENTS

| | | |
|---|---|---|
| JP | 61-155944 | 9/1986 |
| JP | 6-35596 | 2/1994 |
| JP | 7-319609 | 12/1995 |
| JP | P2000-194506 | * 7/2000 |
| JP | 2001-43003 | 2/2001 |

* cited by examiner

*Primary Examiner*—Chanh Nguyen
(74) *Attorney, Agent, or Firm*—Whitham, Curtis & Christofferson, P.C.

(57) ABSTRACT

A touch panel input device includes layers A and B. Layer A includes a first transparent film, a first transparent resistive film, a second transparent film, a second transparent resistive film, and first dot spacers. Layer B includes a second transparent film, a third transparent resistive film, a fourth transparent resistive film, a glass substrate, and second dot spacers. When the device is operated by a finger, the device detects a contact state of the transparent resistive films in layer A and a non-contact state of the transparent resistive films in layer B. When the device is operated by a finger, the device detects a contact state of the transparent resistive films in layer A and a contact state of the transparent resistive films in layer B. Regardless of the input mode, information of a position thus inputted can be detected. The touch panel input device detects, regardless of the input mode to use a pen or a finger, information of a position inputted by a pen or by a finger.

6 Claims, 12 Drawing Sheets

| わ | ら | や | ま | は | な | た | さ | か | あ |
|---|---|---|---|---|---|---|---|---|---|
| を | り | ゆ | み | ひ | に | ち | し | き | い |
| ん | る | よ | む | ふ | ぬ | つ | す | く | う |
| 、 | れ | ゛ | め | へ | ね | て | せ | け | え |
| 。 | ろ | ゜ | も | ほ | の | と | そ | こ | お |
| ¥ | ? | ! | & | + | ー | っ | ょ | ゅ | ゃ |

FIG. 16

| な | た | さ | か | あ |
|---|---|---|---|---|
| に | ち | し | き | い |
| ぬ | つ | す | く | う |

F I G. 19
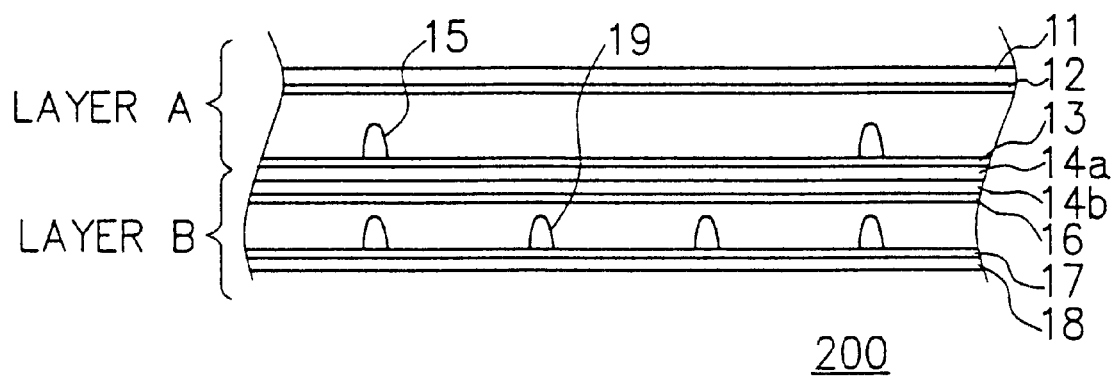

TOUCH PANEL INPUT DEVICE CAPABLE OF SENSING INPUT OPERATION USING A PEN AND A FINGERTIP AND METHOD THEREFORE

BACKGROUND OF THE INVENTION

The present invention relates to a touch panel input device, and in particular, to a touch panel input device which is disposed in a display section including a liquid-crystal device (LCD) and in which a coordinate signal is sensed using a change in a position depressed by a finger (fingertip), a pen or the same in association with a content displayed on the display section and the coordinate signal thus sensed is inputted to a device connected to the touch panel input device.

DESCRIPTION OF THE PRIOR ART

A touch panel input devices of prior art include a touch panel of transparent resistive film type. FIG. 1 shows in a cross-sectional view a configuration of the touch panel using transparent resistive films 500 of the prior art.

The touch panel 500 shown in FIG. 1 includes a transparent film 51, a first transparent resist film 52, a second transparent resistive film 53, a glass substrate 54, and a dot spacers 55 disposed over an upper surface of the second transparent resistive film 53 with a fixed gap therebetween.

The transparent film 51 includes a flexible transparent film member constituting a surface section of the touch panel 500. The film 51 includes, for example, a transparent plastic film such as polyethylene terephthalate (PET). The film 51 has a flexibility enough to easily bend or to easily change its form when depressed by a finger or a pen.

The first transparent resistive film 52 includes a transparent conductive film made of, for example, indium tin oxide (ITO) or $SnO_2$. The film 52 is arranged entirely on a lower surface of the transparent film 51 and has nearly a uniform thickness. When the film 51 is pushed by a finger, the film 52 is distorted together with the film 51.

The second transparent resistive film 53 includes, like the first transparent resistive film 52, a transparent conductive film made of the above-mentioned same materials. The film 53 is arranged throughout on an upper surface of the glass substrate 54, which will be described later, and has nearly a uniform thickness.

The glass substrate 54 forms a bottom section of the touch panel. The film 53 having a uniform thickness is disposed entirely on an upper surface of the glass substrate 54.

The dot spacers 55 prevent the first transparent resistive film 52 on the transparent film 51 from being brought into contact with the second transparent resistive film 53 arranged on the glass substrate 54 in an no-input state of the panel 500. Additionally, density of dot spacers 55 determines magnitude of pressure required to bring the transparent resistive film 52 into contact with the transparent resistive film 53.

FIG. 2 shows in a cross-sectional view a state of the touch panel 500 using transparent resistive films of the prior art in which the panel is depressed by a touch panel pen or a fingertip of a user.

When the user pushes, by his or her finger or a pen, the transparent film 51 on the upper surface side of the touch panel 500, the films 51 an 52 are rendered to a distorted state as shown in FIG. 2.

The film 51 on the upper surface side of the touch panel 500 is bent by pressure of the pen or a fingertip, and the first transparent resistive film 52 makes contact with the second transparent resistive film 53. The films 52 and 53 are set to an electrically conductive state. By sensing the conductive state, the panel 500 detects an event of depression on the film 51.

FIG. 3 shows constitution of a sensor circuit to sense an input coordinate position in a touch panel using transparent resistive films of the prior art. The position sensor senses a pair of coordinates (input coordinates) of a contact point between the films 52 and 53.

The input coordinate sensor of the touch panel shown in FIG. 3 includes a first transparent resistive film 601, a second transparent resistive film 602, a first resistor 603 schematically shown on the first film 601, a second resistor 604 schematically shown on the second film 602, analog switches 605 to 608, and analog-to-digital (A/D) converters 609 and 610.

Although each of the resistors 603 and 604 includes one resistor having an ordinary contour in FIG. 3, the resistor actually has a planar shape, namely, a transparent resistive film like the first and second transparent resistive films 601.

The first resistor 603 (first transparent resistive film 601) has two electrodes respectively connected to the analog switches 605 and 606. The switches 605 and 606 are coupled with a power source voltage V and ground, respectively.

The second resistor 604 (second transparent resistive film 602) includes two electrodes linked with the analog switches 607 and 608, respectively. Connected to the switches 607 and 608 are a power source voltage V and ground, respectively.

In FIG. 3, the first and second transparent resistive films 601 and 602 are fixed or laminated onto each other such that the electrodes 605 and 606 of the film 601 are vertical to the electrodes 607 and 608 of the film 602. The first and second electrodes 603 and 604 are respectively coupled with the A/D converters 609 and 610.

Referring to the input coordinate sensing circuit shown in FIG. 3, description will a given of operation to sense a contact point, namely, a pair of coordinates associated with actual depression on the touch panel. Assume tat the transparent film 51 of the touch panel 500 is depressed at a position by a fingertip or a pen of the user, for example, as shown in FIG. 2 and the upper 52 and lower films 53 are brought into contact with each other at the depressed position.

FIG. 4 shows a first configuration of a state of the input coordinate sensor in which the touch panel is in the state of FIG. 2. When the user pushes a particular point on the touch panel in the situation of FIG. 4, the sensor conducts control operation to drive switches thereof to enter a subsequent state.

As a result of the control operation of the switches, a linear potential distribution is formed on the first resistor 603 ranging from a voltage V (volt) to 0 (volt) in a direction as indicated by an arrow mark a as shown in FIG. 4.

In FIG. 4, an arrow mark b designates a point (to be referred to as a "contact point" herebelow) at which the first and second transparent resistive films 601 and 602 come in contact with each other. By reading a value indicated by the A/D converter 609 in this state, an electric potential at the contact point indicated by the arrow mark b on the second resistor 604 can be detected. Since the potential is linearly distributed on the second resistor 604 ranging from a voltage V (volt) to 0 (volt), the obtained potential tells distance of the point from the electrode c in the direction of the arrow mark a. When the direction is aligned to that of an x axis of the coordinate system, the obtained value represents an x coordinate value.

FIG. 5 shows a second construction of a state of the input coordinate sensor associated with the state of the touch panel in FIG. 2. In response to depression at a particular point on the touch panel in the state shown in FIG. 4, the sensor controls its switches to enter a next state.

As shown in FIG. 5, the control operation of the switches causes a linear potential to ve linearly distributed on the first resistor 603 ranging from a voltage V(volt) to 0(volt) in a direction as designate by an arrow mark d.

In FIG. 5, an arrow mark b indicates a point (a contact point) between the first and second transparent resistive films 601 and 602. By sensing a value resultant from the A/D converter 610 in this situation, potential at the contact point indicated by the arrow mark b on the first resistor 603 can be detected. Also distributed on the first resistor 603 is a linear potential ranging from a voltage V (volt) to 0 (volt), the potential represents distance of the point from the electrode e in the direction of the arrow mark d. By aligning the direction to that of a y axis of the coordinate system, the obtained value represents a y coordinate value.

In the prior-art touch pen using transparent resistive films, a pair of x and y coordinates of the point touched or depressed by a pen or a fingertip can be sensed through the operations shown in FIGS. 4 and 5.

FIGS. 6A and 6B show cross-sectional views of an embodiment of a prior-art touch panel of transparent resistive film type. When the dot spacers 55 are arranged with a smaller interval therebetween as shown in FIG. 6A, distance (an area associated with depression on the touch panel) between supporting points (dot spacers) of the distorted films 51 and 52 is reduced. That is, stronger pressure is required to bring the first and second transparent resistive film 52 and 53 into contact with each other. When the dot spacers 55 are disposed with a larger interval therebetween as shown in FIG. 6B, distance (an area corresponding to depression on the touch panel) between supporting points (dot spacers) of the depressed films 51 and 52 is enlarged. This indicates that relatively weaker pressure is necessary for the film 52 to come contact with the second film 52.

As above, in the touch panel using transparent resistive films of the prior art, load necessary to establish the contact state between the upper and lower transparent resistive films is adjusted according to the interval between the dot spacers.

For example, in a touch panel exclusively used with a pen, the dot spacer interval is relatively smaller such that stronger pressure is required to bring the upper and lower films into contact with each other. In operation, even when other than a pen, for example, a part of the user such as a palm touches the touch panel, an erroneous operation does not easily take place. That is, the palm is softer than the pen and hence comes into contact with the touch panel (the transparent film) through a wider area. Load thereof imposed on the touch panel is applied not at one point but at an area in a distributed manner. Therefore, the load is relatively weaker and does not easily bring the upper transparent resistive film into contact with the lower transparent resistive film. Consequently, the touch panel can continue normal operation without errors.

In a touch panel dedicatedly used with fingers, the dot spacer interval is relatively wider. That is, less strong pressure is necessary to bring the upper and lower films into contact with each other. As described above, when compared with a pen input, the finger input is softer and its load is distributed. Therefore, to sense the contact state between the upper and lower transparent resistive films under weaker pressure of a finger, the dot spacers are disposed with a relatively wider interval therebetween.

However, in the touch panels using transparent resistive films shown in the prior art examples, the dot spacers are arranged with an intermediate interval therebetween so that the touch panel is used with a pen and fingers. Therefore, in a pen-input mode, when a part of a hand mistakenly touches the touch panel, an erroneous input easily takes place. Since the dot spacer interval is smaller than that of a touch panel for use with fingers, higher pressure of a finger is required for recognition of the input operation.

SUMMARY OF THE INVENTION

It is therefore an object of the present invention to provide a touch panel input device capable of sensing input operation using a pen and a fingertip.

In accordance with the present invention, there is provided a touch panel input device, comprising a first touch panel and a second touch panel, the first touch panel being laminated onto said second touch panel.

In accordance with the present invention, the first touch panel comprises a first transparent film, a second transparent film, a first transparent resistive film arranged on a lower surface of said first transparent film, a second transparent resistive film arranged on an upper surface of said second transparent film, and first dot spacers arranged between said first and second transparent resistive films, said first transparent resistive film opposing said second transparent resistive film. It is preferable that first dot spacers is arranged with an equal interval between the first and second transparent resistive films.

In accordance with the present invention, the second touch panel comprises a third transparent resistive film arranged on a lower surface of said second transparent film, a glass substrate, a fourth transparent resistive film arranged on an upper surface of said glass substrate, and second dot spacers arranged with an equal interval between said third and fourth transparent resistive films, said third transparent resistive film opposing said fourth transparent resistive film.

In accordance with the present invention, the second touch panel comprises a third transparent film, a third transparent resistive film arranged on a lower surface of said third transparent film, a glass substrate, a fourth transparent resistive film arranged on an upper surface of said glass substrate, and second dot spacers arranged with an equal interval between said third and fourth transparent resistive films, said third transparent resistive film opposing said fourth transparent resistive film.

In accordance with the present invention, the first dot spacers are arranged with an interval wider than that of said second dot spacers.

In accordance with the present invention, the device further includes a touch panel controller for controlling said first and second touch panels. The controller includes determining means for determining, according to a contact state between said first and second transparent resistive films of said first touch panel and a contact state between said third and fourth transparent resistive films of said second touch panel, that an input operation is conducted by a fingertip or a pen.

In accordance with the present invention, the determining means determines, when said first and second transparent resistive films is in a contact state and said third and fourth transparent resistive films is in a non-contact state, that the input operation is conducted by a fingertip. The determining means determines, when said first and second transparent resistive films is in a contact state and said third and fourth transparent resistive films is in a contact state, that the input operation is conducted by a pen.

In accordance with the present invention, there is provided a touch panel input device which has structure including two touch panels attached onto each other to thereby enhance good usability as a touch panel for a finger and as a touch panel for a pen.

BRIEF DESCRIPTION OF THE DRAWINGS

The objects and features of the present invention will become more apparent from the consideration of the following detailed description taken in conjunction with the accompanying drawings in which:

FIG. 15 is a plan view showing a display example in which the virtual keyboard of FIG. 14 is subdivided into four partitions;

FIG. 16 is a plan view showing a magnified view of one of the four partitions of the virtual keyboard of FIG. 15;

FIG. 19 is a cross-sectional view showing an outline of structure of a third embodiment of a touch panel input device in accordance with the present invention.

DESCRIPTION OF THE EMBODIMENTS

Referring to the accompanying drawings, description will be given in detail of an embodiment of a touch panel input device in accordance with the present invention. FIGS. 7 to 19 show embodiments of a touch panel input devices in accordance with the present invention.

First Embodiment

Figure 1:
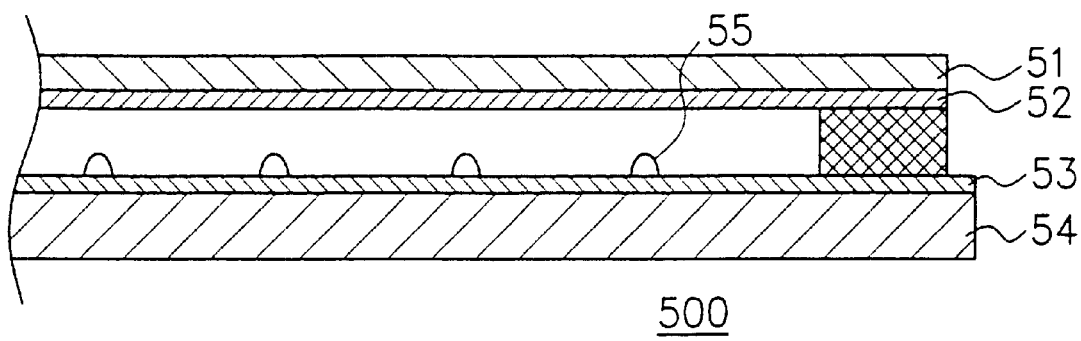
FIG. 1 is a cross-sectional view showing structure of a touch panel of transparent resistive film type of the prior art.
Figure 2:
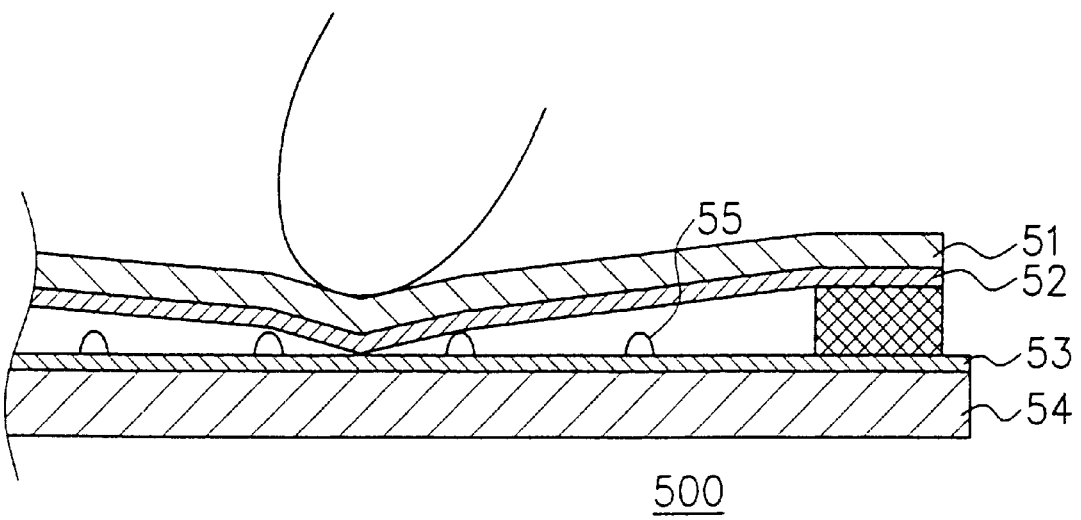
FIG. 2 is a cross-sectional view showing a situation in which a touch panel of FIG. 1 is pressed by a pen or a fingertip.
Figure 3:
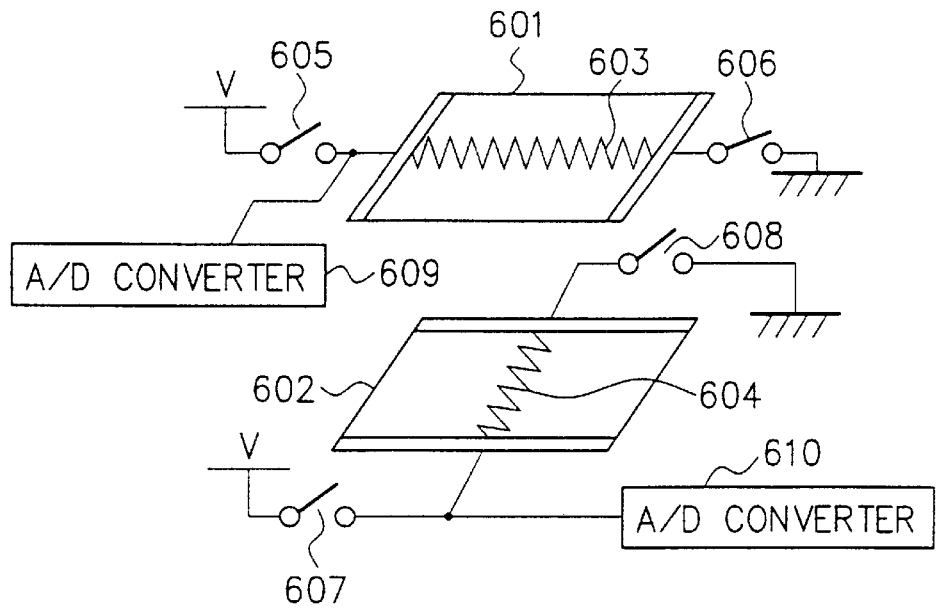
FIG. 3 is a diagram showing a circuit configuration of an input coordinate position sensor in the touch panel of transparent resistive film type of the prior art.
Figure 4:
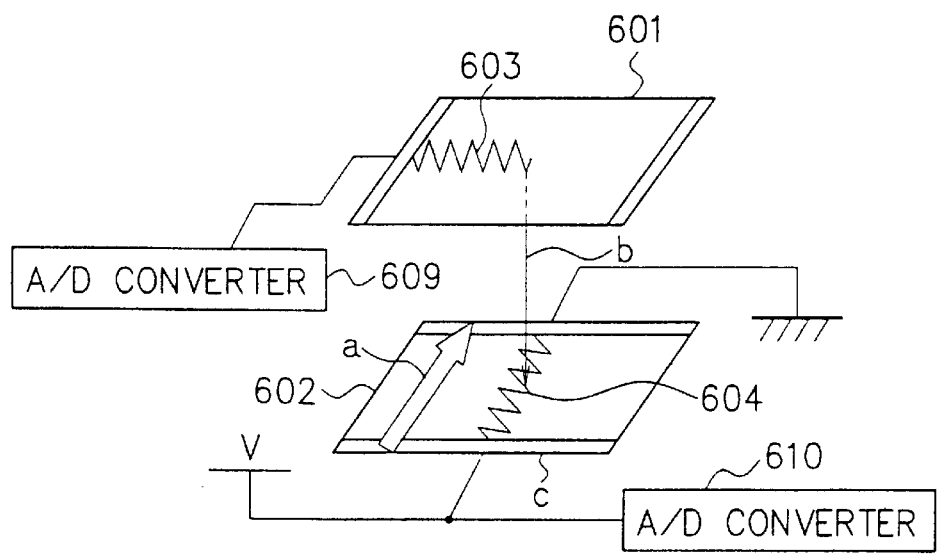
FIG. 4 is a first configuration diagram showing a state of the input coordinate position sensor in the state of FIG. 2.
Figure 5:
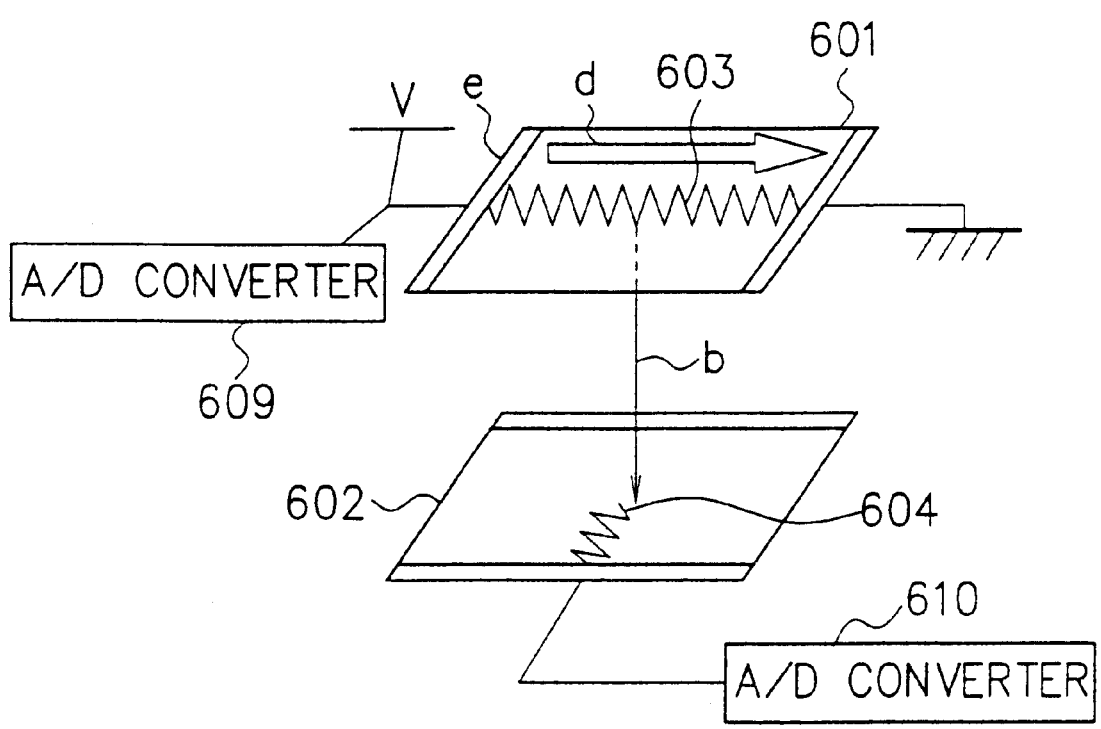
FIG. 5 is a second configuration diagram showing a state of the input coordinate position sensor in the state of FIG. 2.
Figure 6A:
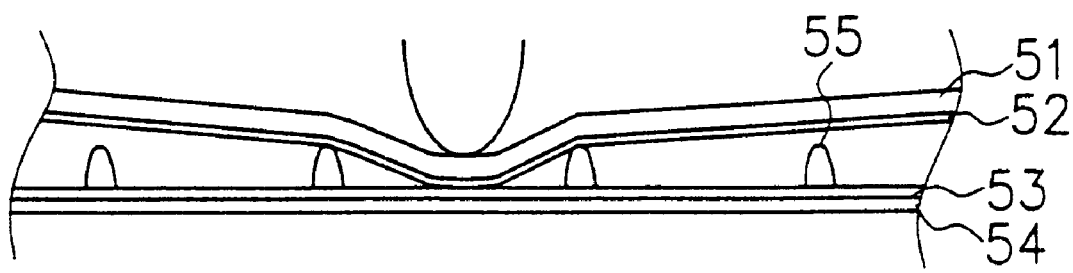
FIGS. 6A and 6B are cross-sectional views showing prior-art embodiments of a touch panel using transparent resistive films.
Figure 6B:
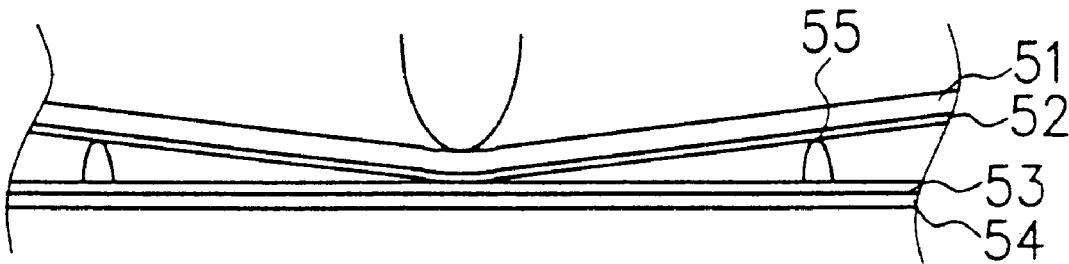
Figure 7:
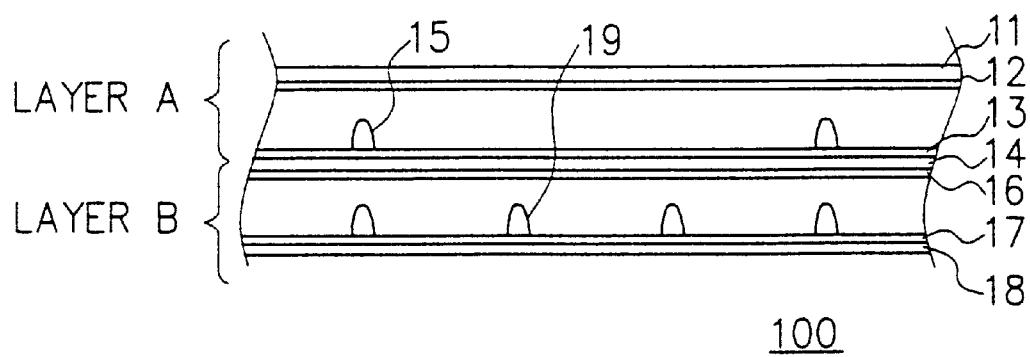
FIG. 7 is a cross-sectional view showing an outline of constitution of first and second embodiments of a touch panel input device in accordance with the present invention.

FIG. 7 shows in a cross-sectional view and outline of constitution of a first embodiment of a touch panel input device in accordance with the present invention. Shown in FIG. 7, a first embodiment of a touch panel input device 100 primarily includes two layers, namely, a first touch panel is layer A and a second touch panel is layer B.

Layer A disposed on an upper side in FIG. 7 includes, in a downward direction, a first transparent film 11, a first transparent resistive film 12, a second transparent resistive film 13, a second transparent film 14, and first dot spacers 15.

Layer B arranged on a lower side in FIG. 7 includes, in a downward direction, a third transparent resistive film 16, a fourth transparent resistive film 17, a glass substrate 18, and second dot spacers 19.

Preferably, as shown in FIG. 7, the first dot spacers 15 are higher density than the second dot spacers 19, for example, 2 times or more. However, the present invention contains the state of the density of the spacers 19 are equal or less than that of the spacers 15 as obtaining an effect of the present invention.

The first transparent film 11 forms a surface of the touch panel input device 100 and includes a plastic resin film of, for example, polyethylene terephthalate (PET) as in the prior art examples. The film 11 is flexible to easily bend in response to pressure of a finger of the user.

The first transparent resistive film 12 is a transparent conductive film of, for example, ITO or $SnO_2$. The film 52 is arranged entirely on a lower surface of the first transparent film 11 and has nearly a uniform thickness. When the film 11 is pressed, the film 12 is distorted together with the film 11.

The second transparent resistive film 13 includes, like the film 12, a transparent conductive film of same materials. The film 12 is disposed entirely on an upper surface of the second transparent film 14.

The second transparent film 54 is disposed as a bottom section of layer A, entirely on the film 14, the second transparent resistive film 13 is formed with nearly a uniform thickness.

The first dot spacers 15 are arranged with (nearly) an equal interval therebetween on the second transparent resistive film 13 on the second transparent film 14. The spacers 15 prevent contact between the transparent resistive films 12 and 13 in a non-input state.

The third transparent resistive film 16 is, like the first and second transparent resistive films 12 and 13, a transparent conductive film made of same materials. The film 16 is arranged entirely on a lower surface of the second transparent film 14 and has a uniform thickness.

The fourth transparent resistive film 17 includes, like the first to third transparent resistive films 12, 13, and 16, a transparent conductive film made of same materials. The film 17 is disposed entirely on an upper surface of the glass substrate 18, which will be described below.

The glass substrate 18 is a glass substrate and/or a hard materials, for example, (a) hard plastics forming a bottom section of the touch panel 100. Disposed entirely on the glass substrate 18 is the fourth transparent resistive film 17 with nearly a uniform thickness.

The second dot spacers 19 are disposed with an equal interval therebetween on the fourth transparent resistive film 13 on the glass substrate 18. The spacers 19 prevent contact between the transparent resistive films 16 and 17 in a non-input state.

According to the interval of the dot spacers 15 and 19, strength of pressure (of depression) of a pen or a fingertip can be adjusted.

The touch panel input device 100 as the embodiment of the present invention shown in FIG. 7 includes two layers, i.e., layers A and B as described above. Layer A can be regarded as a first touch panel for finger input including a film, not a glass substrate, as its bottom. It can be considered that layer B is a second touch panel for pen input including a glass substrate as its bottom.

Figure 8:
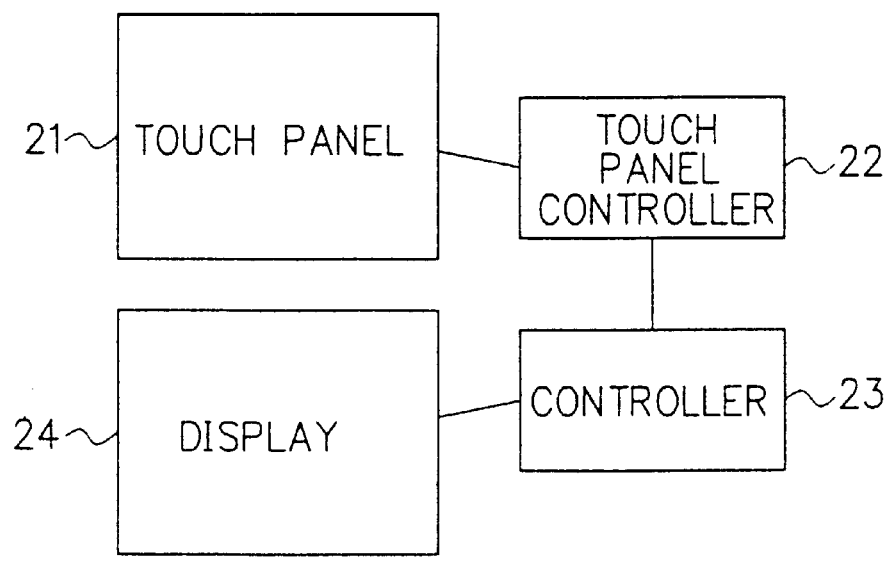
FIG. 8 is a block diagram schematically showing structure of an embodiment of a touch panel input device in accordance with the present invention.

FIG. 8 shows in a block diagram an outline of structure of the touch panel input device 100 configured as the first embodiment in accordance with the present invention. The device 100 of FIG. 8 includes a touch panel 21, a touch panel controller 22, a controller 23, and a display section 24.

The touch panel 21 is a transparent touch panel constructed as shown in FIG. 7. The panel 21 is placed onto the display section 24, which will be described later. Resultantly, information displayed on the display section 24 is visually checked via the touch panel 21 by the user.

The touch panel controller 22 supervises layers A and B of the 2-layer touch panel 21 in which layers A and B are independently controlled. For example, the controller 22 senses a coordinate position depressed by a pen or a finger (tip).

The controller 23 supervises operations of the touch panel input device and includes a central processing unit (CPU) and a memory, not shown. The controller 23 reads from the memory a control program to supervise overall operation of the touch panel input device and executes the program by the CPU to achieve the control operation. Additionally, the controller 23 also conducts display control. That is, the controller 23 is connected to the display section 24 to change contents displayed on the display section 24 according to input coordinate data sensed by the touch panel controller 22.

The display section 24 is a display unit to display various information items in response to control indication from the controller 23 and includes, for example, a liquid crystal display (LCD). The display section 24 in the embodiment may display a selection screen selected by the user and/or a screen containing information of notification for the user.

Figure 9:
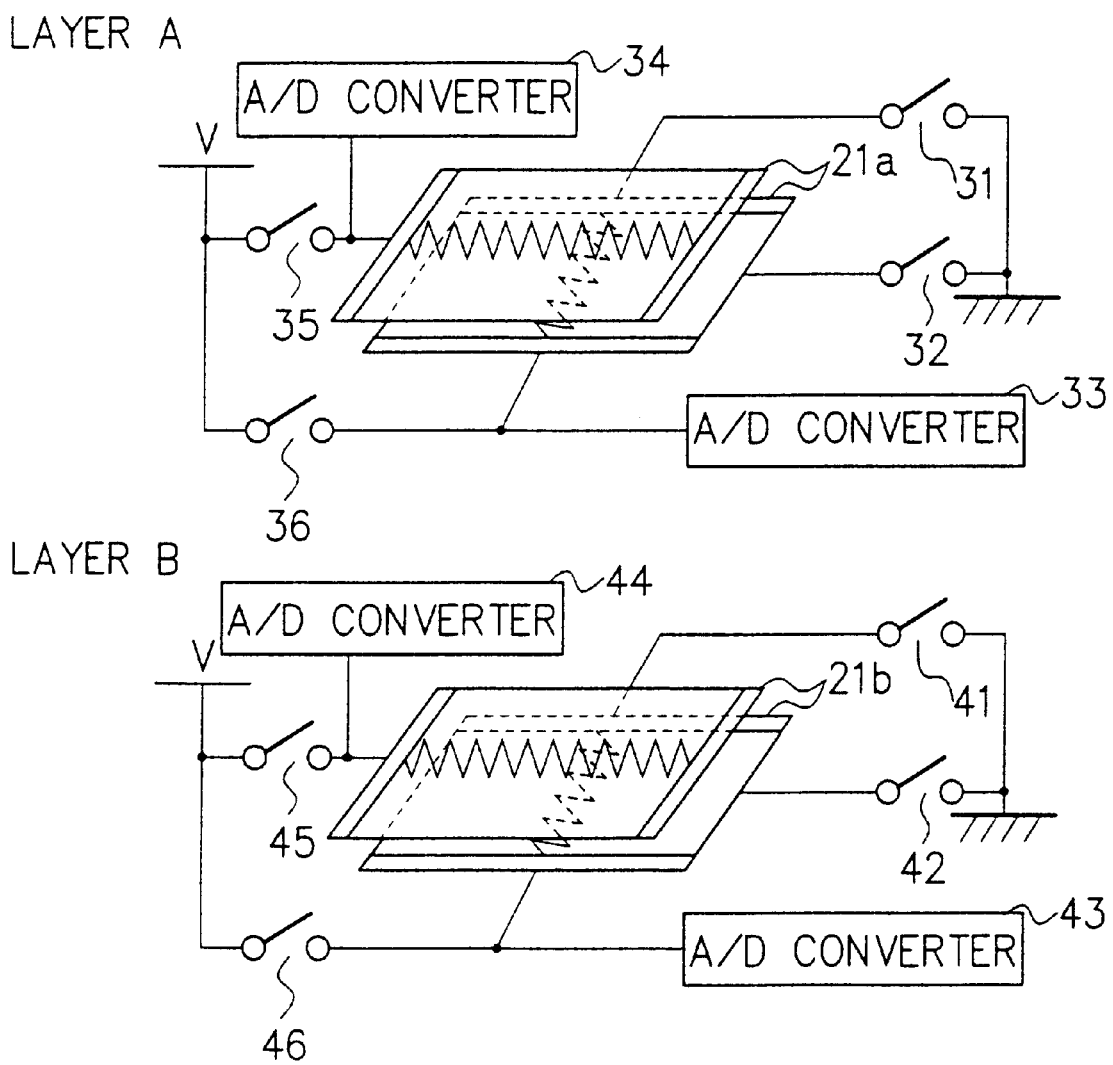
FIG. 9 is a circuit diagram showing a detailed configuration of an embodiment of a touch panel controller in accordance with the present invention.

FIG. 9 shows an outline of constitution of the touch panel controller in the touch panel input device as the first embodiment of the present invention. The configuration of FIG. 9 includes a touch panel controller 22 connected to the first touch panel 21a including the first and second transparent resistive films corresponding to layer A shown in FIG. 7. The touch panel controller 22 includes analog switches 31 and 32, A/D converters 33 and 34, and analog switches 35 and 26.

Connected further to the touch panel controller 22 is the second touch panel 21b including the third and fourth transparent resistive films associated with layer B of FIG. 7. The controller 22 additionally includes analog switches 41 and 42, A/D converters 43 and 44, and analog switches 45 and 46.

Under supervision of the controller 23 shown in FIG. 8, the touch panel controller 22 can control operation of peripheral circuits of the touch panel 100 independently for the first touch panel 21a of layer A and the second touch panel 21b of layer B.

Figure 10:
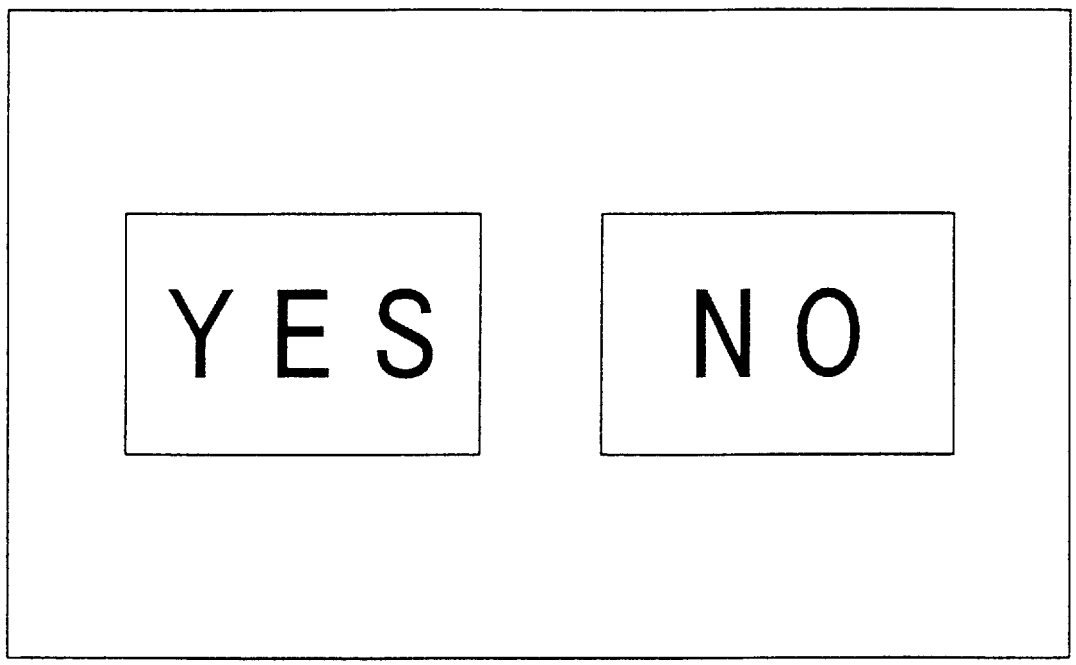
FIG. 10 is a plan view showing a display example of an embodiment of a display section in accordance with the present invention.

FIG. 10 shows an embodiment of a display image presented on the display section of the touch panel input device as the first embodiment thus constructed in accordance with the present invention. The display image shown in FIG. 10 is a selection screen for "YES" and "NO" presented on the display section including an LCD or the like. By touching a desired item of "YES" or "NO" through the touch panel, the user inputs input data for the desired item.

Figure 11:
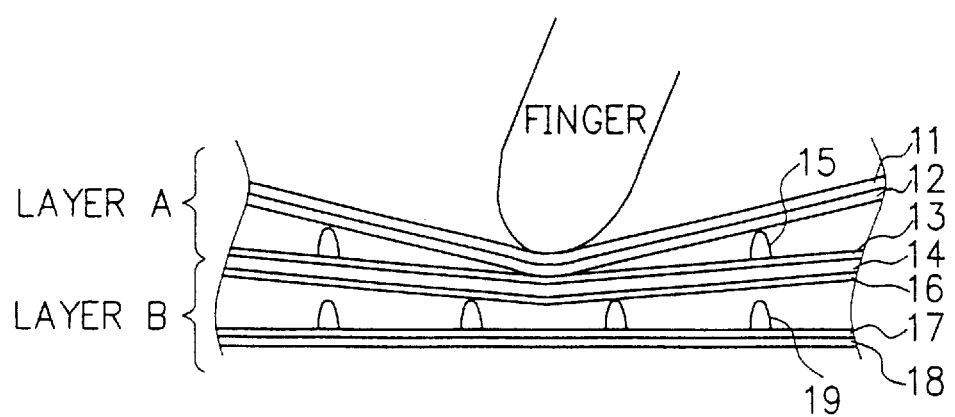
FIG. 11 is a cross-sectional view showing a state in which a touch panel is depressed by a finger in an embodiment in accordance with the present invention.

FIG. 11 shows in a cross-sectional view a state in which data is inputted by a finger from the touch panel input device of the first embodiment. As can be seen from FIG. 11, the first transparent film 11 of layer A is distorted by pressured of the finger. Resultantly, the first transparent resistive film 12 comes into contact with the second transparent resistive film 13. However, the third transparent resist film 16 is supported by the dot spacers 19 not to be accordingly brought into contact with the fourth transparent resistive film 17 in layer B by the depression of the finger. That is, the films 16 and 17 are kept separated from each other.

When the device is used dedicatedly for finger input, the controller 23 shown in FIG. 8 receives from the touch panel controller 22 information indicating presence or absence of contact between the films 12 and 13 of layer A. When the contact is sensed, the controller 23 additionally receives information of coordinates of the contact point. According to the coordinate values, the controller 23 determines a selected one of the selection items presented on the display section 24, for example, "YES" or "NO" in FIG. 10. According to a result of the determination, the controller 23 displays a screen image and conducts post processing.

As above, when the device 100 is employed exclusively for fingers, the device 100 can be used in the same way as for a finger-input touch panel by receiving a state of contact between the transparent resistive films 12 and 13 of layer A.

Figure 12:
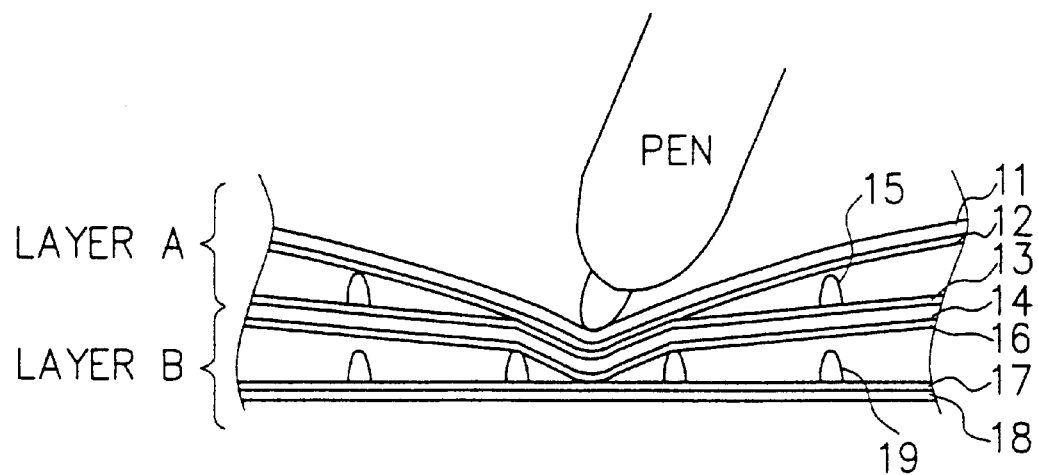
FIG. 12 is a cross-sectional view showing a situation in which a touch panel is depressed by a pen in an embodiment in accordance with the present invention.

FIG. 12 shows in a cross-sectional view a state in which data is inputted by a pen in the touch panel input device as the first embodiment. Referring to FIG. 12, description will be given of operation in which an image is drawn by a pen on the touch panel 21 and coordinates associated with the image is inputted to the touch panel input device.

In FIG. 12, when a pen depresses the first transparent film 11 of layer A to input data, the film 11 is distorted and then the first transparent resistive film 12 is brought into contact with the second transparent resistive film 13. Moreover, the third transparent resistive film 16 comes into contact with the fourth transparent resistive film 17.

Figure 13:
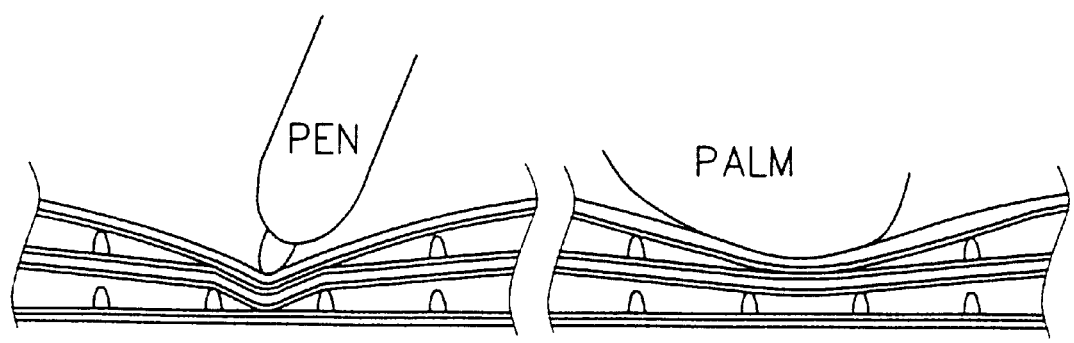
FIG. 13 is a cross-sectional view showing a state in which a finger touches a touch panel in a pen input mode in an embodiment in accordance with the present invention.

When the device is exclusively used for a pen, the controller 23 of FIG. 8 presence/absence of contact between the films 16 and 17 of layer B receives from the touch panel controller 22. When the contact is present, the controller 23 further receives coordinates of the contact point. In a pen input mode, even when part of a hand touches the touch panel surface as shown in FIG. 13, the controller 23 can appropriately control operations using the input coordinates of layer B, not the input coordinates of layer A. Therefore, only the coordinates associated with the pen input can be received without input errors.

When the device is used dedicatedly for a pen, even if a finger touches the touch panel by mistake, since the touch by the finger causes the contact only in layer A, there does not occur any input error.

Description will now be given of an operation example to automatically determine that an input from the touch panel 21 is conducted by a finger(tip) or a pen in the touch panel input device in the first embodiment configured as above in accordance with the present invention.

Figure 14:
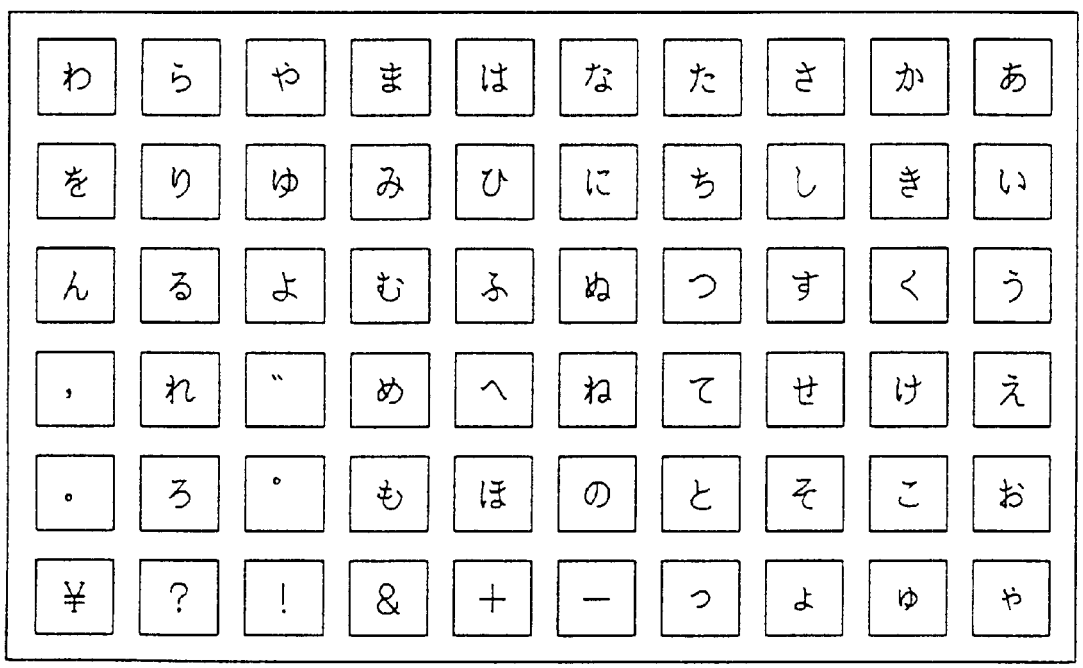
FIG. 14 is a plan view showing a display example in which a virtual keyboard is displayed on a display section of an embodiment in accordance with the present invention.
Figure 18:
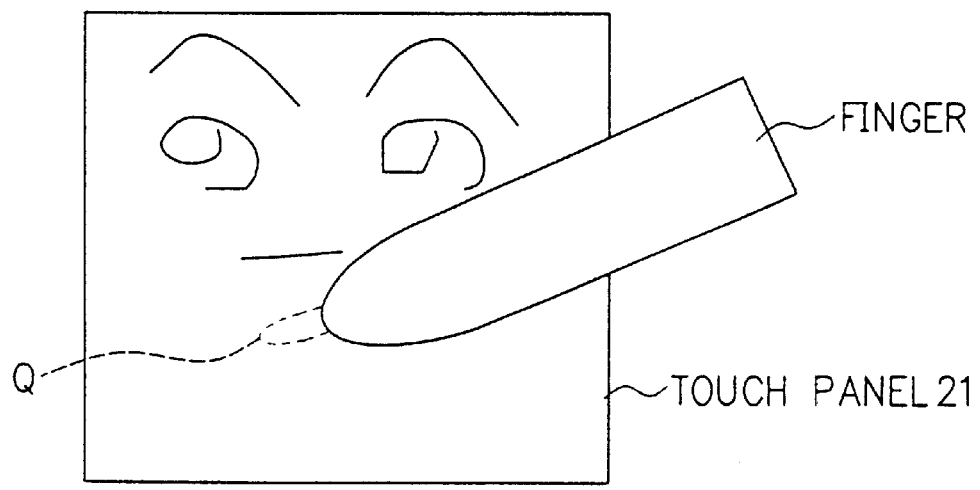
FIG. 18 is a plan view showing a case in which the image inputted by hand is erased in an embodiment of a touch panel in accordance with the present invention.

FIG. 14 shows in a plan view a display example of a virtual keyboard presented on the display section in an input operation for the automatic determination. In FIG. 18, when pressure by a finger is senses on a particular character displayed in the virtual keyboard, the transparent resistive layers of layer A is in a contact state. When pressure by a pen is detected, the transparent resistive layers of layer A and those of layer B are in a contact state.

Therefore, in the automatic determination of the finger or pen input, when the controller 23 detects the contact state in layer A of the touch panel 21 and does not detect the contact state in layer B, the controller 23 can determine that the data is inputted by a finger. When the contact state in layer A of the touch panel 21 and the contact state in layer B are detected, the controller 23 can determine that the data is inputted by a pen.

Description will now be given in detail of an input operation by displaying, for example, the virtual keyboard of FIG. 14 on the display section 14. In FIGS. 14 to 16, Japanese characters is used only to explain the present invention. The present invention is not restricted to the characters. Each key of the virtual keyboard on the display section is, for example, a size of about 5 millimeters (mm) by about 5 mm. The size is too small for the finger input operation. That is, only a selected key among these keys cannot be correctly pressed by the finger, and hence the user must employ a pen.

When a pen is used to input data via the virtual keyboard, the controller 23 automatically determines the pen input operation according to the conditions described above and then receives coordinates of a contact point between the transparent resistive films of layer B in the touch panel 21. According to the coordinates, the controller 23 identifies a key pushed by the pen and inputs a pertinent character to the device.

When a finger is used to touch the virtual keyboard, the controller 23 automatically determines the finger input mode as above and then receives information of coordinates of a contact point between the transparent resistive films of layer A in the touch panel 21. The controller 23 divides the image of the virtual keyboard into four partitions or areas as shown in FIG. 15 to identify in which one of the areas the coordinates belong in the image.

After having identifies the area of the contact point, the controller 23 controls the display section 24 to display a magnified image of the pertinent area as shown in FIG. 16. When the coordinates belong in a plural of the four partitions or areas, then the controller 23 controls the display section 24 to display in following order of a number of the coordinates belonged to the partitions or areas is large (or small).

In the virtual keyboard of FIG. 16, each key has a size of about 10 mm by about 10 mm. The size allows an appropriate operation of a finger. The user conducts again a desired operation using the magnified keyboard image. The controller 23 acquires coordinates of a contact point from layer a of the touch panel 21.

According to the coordinates thus obtained, the controller 23 identifies a key pushed in the virtual keyboard of FIG. 16 and inputs a character finally recognized to the device. When the character is completely inputted, the display section 24 again displays the image of FIG. 14. Processing goes to a wait state for a next input operation by a fingertip or a pen.

Second Embodiment

Description will be given of a second embodiment in accordance with the present invention. It is assumed that the second embodiment includes a configuration similar to that of the first embodiment of the present invention.

The second embodiment is a handwritten image input device using a touch panel. The touch panel input device of the present invention can determine a finger input operation and a pen input operation as described in conjunction with the first embodiment.

Figure 17:
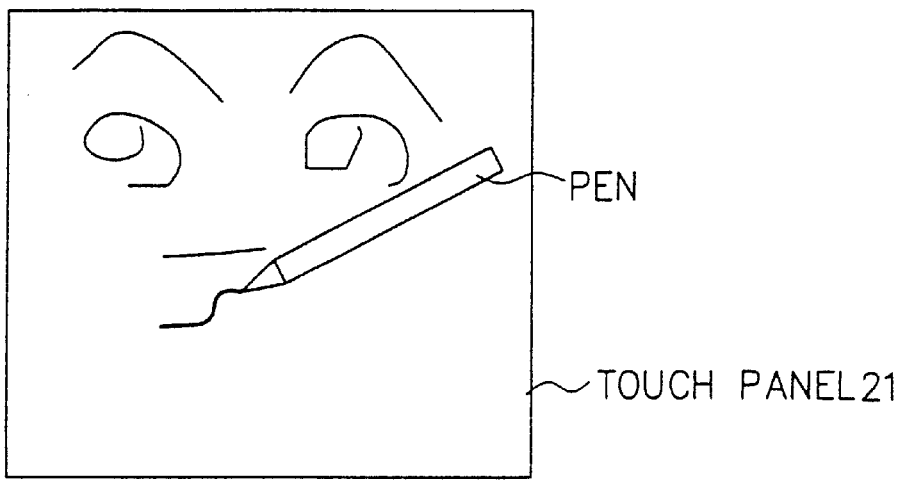
FIG. 17 is a plan view showing a case in which an image is drawn by hand in an embodiment of a touch panel in accordance with the present invention.

When it is determined that a pen input operation is conducted, the touch panel input device of the second embodiment receives, like the first embodiment, coordinates of a contact point of layer B of the touch panel shown in FIG. 7. In the second embodiment of the touch panel input device, points corresponding to the coordinates received from the touch panel 21 are drawn on the display section 24. Therefore, by drawing a picture on the touch panel 21 by a pen as shown in FIG. 17, an image of the handwritten picture can be displayed on the display section 24.

When the touch panel input device of the second embodiment determines that data is input by a fingertip, coordinates are received from layer A of the touch panel shown in FIG. 7 as in the first embodiment. In the operation, the second embodiment clears, on the display section 24, an area in a circle with a radius of about 5 mm centered on a point corresponding to the received coordinates.

Resultantly, by moving the finger(tip) on the touch panel, the displayed image can be erased on the display section 24 as shown in FIG. 18. In an area within a dotted line indicated by Q in FIG. 18, the displayed images have been erased by moving the fingertip.

That is, a desired picture can be drawn by a pen on the display section 24. When it is desired to erase a section of the picture, the user need only move the fingertip on the display section along the desired section to be erased. The touch panel input device can be therefore used as an image input device which can be uses as a blackboard.

Third Embodiment

Description will now be given of a third embodiment in accordance with the present invention.

FIG. 19 shows in a cross-sectional view an outline of structure of a third embodiment of a touch panel input device in accordance with the present invention.

The structure of FIG. 19 includes a touch panel input device 200 as the third embodiment in accordance with the present invention. Like the first and second embodiments, the third embodiment mainly includes two layers, i.e., layers A and B.

The third embodiment differs from the first and second embodiments in that the second transparent film 14 shown in FIG. 7 is substituted for two independent transparent films 14a and 14b.

Therefore, layers A and B are electrically and/or structurally independent completely touch panels. By simply attaching two touch panels to each other, there can be implemented a device similar to the touch panels of the first and second embodiments.

For the touch panel of layer B of FIG. 19, a general touch panel of the prior art is available. In the touch panel of layer A in FIG. 19, only the material of the bottom section is changed from glass to a film. Consequently, a touch panel production process of the prior art can be directly used and hence the initial cost can be minimized and productivity can be increased.

The embodiments described above are preferred embodiments of the present invention and can be changed and modified within a scope of the present invention.

As can be understood from the description, in the touch panel input device of the present invention including two touch panels attached onto each other, when a position is inputted by a finger(tip) or a pen, information of the position indicated by the fingertip or a pen can be appropriately detected in any situation.

In the touch panel input device of the present invention, when a position is inputted, it is possible to identify automatically that the input operation is conducted by a finger or a pen according to pressure received. Therefore, even if an erroneous input is caused, for example, by touching the touch panel by a hand in a pen input mode, the device can conduct control operation so that the erroneous input is appropriately rejected.

For the touch panel input device of the present invention, the touch panel production process of the prior art can be employed as a production process. This lowers the initial cost and improves productivity.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A touch panel input devise, comprising:

a first touch panel; and a second touch panel, said first touch panel comprises:
  a first transparent film;
  a second transparent film;
  a first transparent resistive film arranged on a lower surface of said first transparent film;
  a second transparent resistive film arranged on an upper surface of said second transparent film; and
  first dot spacers arranged between said first and second transparent resistive films, said
  first transparent resistive film opposing said second transparent resistive film; said second touch panel comprises:
  a third transparent resistive film arranged on a lower surface of said second transparent film;
  a substrate;
  a fourth transparent resistive film arranged on an upper surface of said substrate; and
  second dot spacers arranged between said third and fourth transparent resistive films, said third transparent resistive film opposing said fourth transparent resistive film;
  said first dot spacers are arranged with an interval wider than that of said second dot spacers; and
  said first touch panel being laminated onto said second touch panel.

2. The touch panel input device claimed in claim 1, further comprising a touch panel controller for controlling said first and second touch panels, said controller including determining means for determining, according to a contact state between said first and second transparent resistive films of said first touch panel and a contact state between said third and fourth transparent resistive films of said second touch panel, that an input operation is conducted by a fingertip or a pen.

3. The touch panel input device claimed in claim 1, further comprising a touch panel controller for controlling said first and second touch panels, said controller including determining means for determining, according to a contact state between said first and second transparent resistive films of said first touch panel and a contact state between said third and fourth transparent resistive films of said second touch panel, that an input operation is conducted by a finger or a pen;

said determining means determines, when said first and second transparent resistive films is in a contact state and said third and fourth transparent resistive films is in a non-contact state, that the input operation is conducted by a finger, and said determining means determines, when said first and second transparent resistive films is in a contact state and said third and fourth transparent resistive films is in a contact state, that the input operation is conducted by a pen.

4. A touch panel input device as in claim 1, wherein said substrate is a glass.

5. A touch panel input device as in claim 1, wherein said substrate is a hard plastic.

6. A determining method using the touch panel input device, including a first touch panel; and a second touch panel, said first touch panel comprises:
  a first transparent film;
  a second transparent film;
  a first transparent resistive film arranged on a lower surface of said first transparent film;
  a second transparent resistive film arranged on an upper surface of said second transparent film; and
  first dot spacers arranged between said first and second transparent resistive films, said first transparent resistive film opposing said second transparent resistive film;

said second touch panel comprises:
  a third transparent resistive film arranged on a lower surface of said second transparent film;
  a substrate;
  a fourth transparent resistive film arranged on an upper surface of said substrate; and
  second dot spacers arranged between said third and fourth transparent resistive films, said third transparent resistive film opposing said fourth transparent resistive film;
  said first dot spacers are arranged with an interval wider than that of said second dot spacers; and
  said first touch panel being laminated onto said second touch panel; comprising the steps of:
    a determining step, when said first an second transparent resistive films are in a contact state and said third and fourth transparent resistive films are in a non-contact state, that the input operation is conducted by a finger, and
    a determining step, when said first an second transparent resistive films are in contact state and said third and fourth transparent resistive films are in a contact state, that the input operation is conducted by a pen.

* * * * *